Oct. 1, 1968 F. J. SORDELLO 3,404,392

MAGNETIC TRACK FOLLOWING SERVO SYSTEM

Original Filed Dec. 18, 1962

INVENTOR.
FRANK J. SORDELLO
BY
*Robert B. Crouch*
ATTORNEY

United States Patent Office 3,404,392

Patented Oct. 1, 1968

3,404,392
MAGNETIC TRACK FOLLOWING
SERVO SYSTEM

Frank J. Sordello, San Jose, Calif., assignor to International Business Machines Corporation, New York, N.Y., a corporation of New York Continuation of application Ser. No. 245,572, Dec. 18, 1962. This application Apr. 14, 1967, Ser. No. 631,103
4 Claims. (Cl. 340—174.1)

ABSTRACT OF THE DISCLOSURE

A servo positioning system for accurately positioning a transducer over a data track by detecting a null zone between two adjacent servo tracks. Two magnetic layers of different coercivity are used such that a plurality of continuous servo tracks are recorded in the lower layer while data tracks are recorded in the upper layer, centered over the null zone between adjacent servo tracks. A single read gap magnetic head is used for simultaneously reading signals from both servo tracks in the lower magnetic layer and the data track from the upper magnetic layer.

This is a continuation of copending application Ser. No. 245,572, filed on Dec. 18, 1962, for "Magnetic Track Following Servo System," and now abandoned. This invention relates to a servo system and more particularly to a track following servo system for positioning a transducer at a desired track location on a magnetic recording medium.

In disk-type random access magnetic memories where data is recorded in concentric circular tracks on the surfaces of disks it is a continuing aim to accurately align a magnetic transducer with a desired track. The degree of accuracy with which the transducer can be positioned determines the spacing necessary between adjacent tracks and thereby largely influences the storage efficiency, i.e., number of characters per unit of area of the memory. In an attempt to increase the accuracy of alignment, servo systems of various types have been proposed for servoing the transducer onto the tracks. These systems have generally employed positioning information in the form of servo signals interspersed with the data in the recording surface or reference patterns permanently recorded on a disk surface. In addition, such systems have required a servo transducer to read the positioning information and a separate data transducer ganged thereto. These features of the known servo systems inherently militate against high storage efficiencies because of the stack-up of mechanical tolerances in the ganged transducers and the fact that a considerable portion of the available disk surface area is given over to the storage of positioning information.

An object of the present invention is to provide a track following servo system for a random access magnetic memory to maintain a transducer in accurate alignment with a recording track, thus permitting a high storage efficiency for the memory.

The above object is realized in the present invention by the provision of a system for servoing a transducer into alignment with a desired data track on a magnetic recording medium. A single continuous linearly recorded servo track is located between each pair of adjacent data tracks, alternate servo tracks being written at different frequencies. A single transducer is provided for simultaneously reading a data track and the servo tracks on either side thereof, and means is provided for filtering the data from the servo information and then comparing the two servo signals to develop a position error signal for the transducer. The error signal is then supplied to an actuator to position the transducer.

The foregoing and other objects, features and advantages of the invention will be apparent from the following more particular description of a preferred embodiment of the invention, as illustrated in the accompanying drawing, wherein.

FIG. *5a* is a side cross section of a transducer and erasing head; and

FIG. *5b* is a bottom view of a transducer and erasing head.

Figure 1:
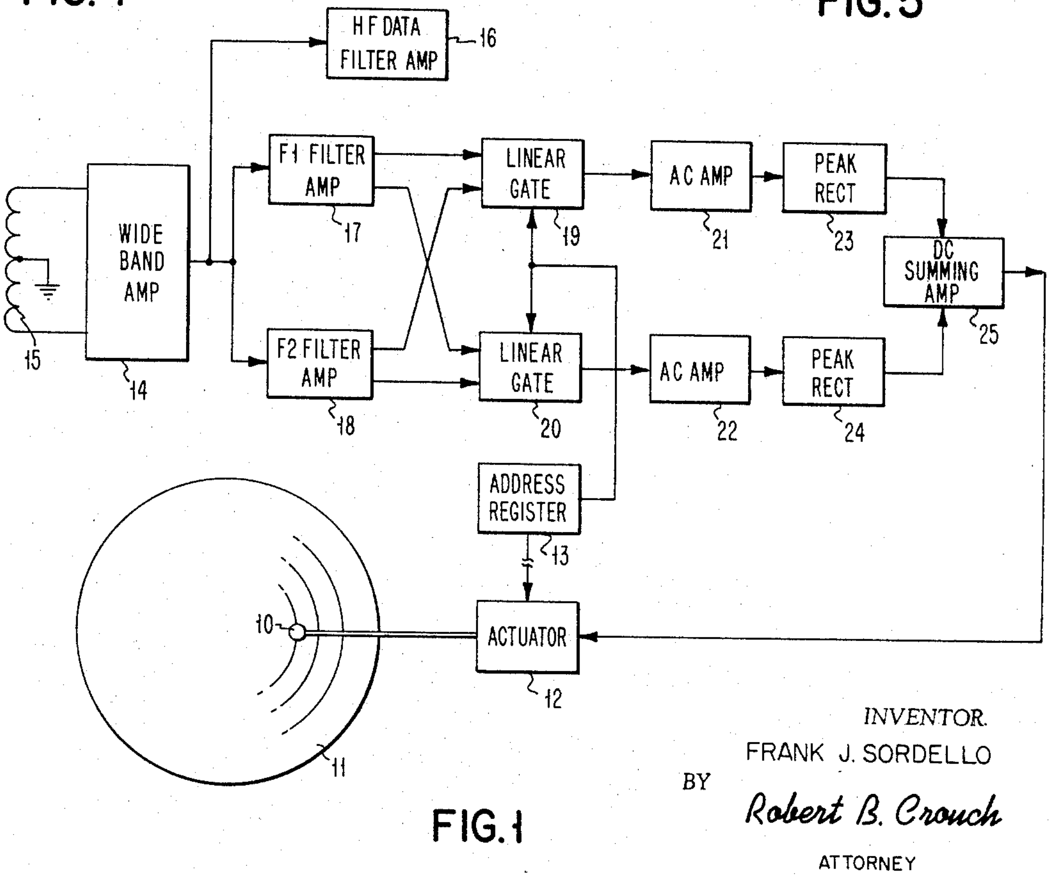
FIG. 1 is a block diagram of circuitry for positioning a transducer over a desired data track on a magnetic recording disk.

As shown in FIG. 1, a transducer 10 is positioned on a magnetic disk 11 by an actuator 12. Coarse positioning signals are transmitted from a track address register 13 to the actuator to position the transducer over a desired track on the disk. Fine positioning signals are then developed in the circuitry of FIG. 1 to control the actuator to keep the transducer centered over the middle of the desired track.

To provide a track following servo, the transducer position error signal must show a measure of the distance off track and a sense or sign indicating direction. In addition this position characteristic should have a null point where the data signals are to be written. To accomplish this, servo signals may be written on either side of the data track, so that the data track lies exactly between the servo signals. The servo signals are written such that they are read back with equal amplitude when the head is directly centered on the data track between them. Provision can be made to take the difference of these amplitudes, so that the net position characteristic is a maximum positive value over one servo signal, decreasing to zero exactly halfway between the two, and increasing to a maximum negative value over the other servo signal.

Figure 2:
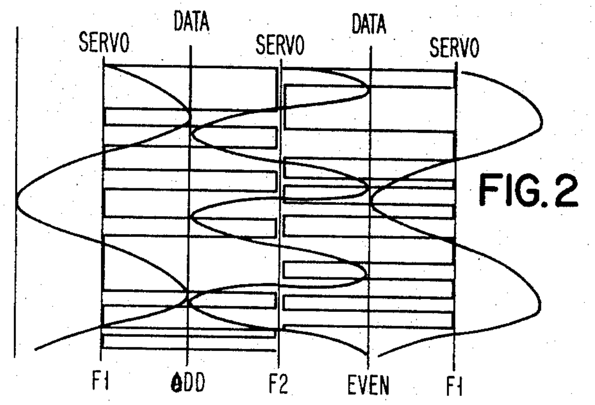
FIG. 2 is a plan view illustrating the servo tracks employed in the present system and their relation to the data tracks.
Figure 3:
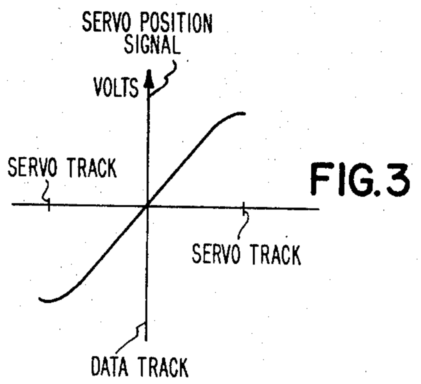
FIG. 3 is a plot of the servo output voltage variation with transducer position.

In the present invention the servo signals are low frequency, linearly-recorded sine waves written in concentric circular tracks. Alternate servo tracks are written at different frequencies, the odd numbered tracks at one frequency F1 and the even numbered tracks at a second frequency F2 as shown in FIG. 2. Frequencies F1 and F2 should be chosen such that one is not a harmonic of the other. When the transducer is to the left of the geometric center of the distance between the adjacent servo tracks it will pick up signals at frequency F1 stronger than at frequency F2. By filtering the frequencies F1 and F2 and separately peak rectifying them, a low frequency D.C. output signal is obtained whose amplitude varies as the transducer position relative to the servo track position in a horizontal plane. When the transducer is in position directly over the geometrical center between adjacent servo tracks, it reads both F1 and F2 at the same amplitude and therefore the D.C. output of F1 will equal the output of F2. If the two D.C. outputs are subtracted from each other, a transducer to track position output profile will be obtained similar to that of FIG. 3. Using this servo track position output voltage curve, the transducer can be positioned to follow the data tracks at the geometrical center of the distance between adjacent servo tracks.

Figure 4:
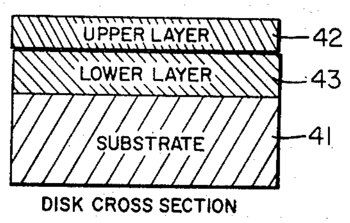
FIG. 4 is a cross section of a magnetic recording disk.
Figure 5:
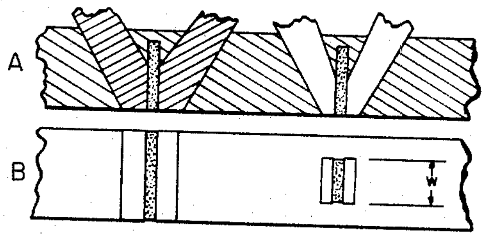
FIG. 5 is a composite of FIGS. *5a* and *5b*.

One application of the present servo system is in connection with a dual magnetic layer disk which includes two distinct magnetic layers of different coercivities superimposed on a non-magnetic substrate. Referring to FIG. 4, the cross section of such a disk is shown. Two magnetic layers of different coercivities, an upper layer 42, and a lower layer 43 are placed on substrate 41. In such an application, the low frequency servo signals may be written in the lower layer and the high frequency data signals recorded in the upper layer directly over the null point between adjacent servo tracks. The lower layer may be written permanently at a frequency or at a band of frequencies whose upper limit is well below the lowest frequency contained in the upper layer. All three signals (F1, F2 and data) can be read back simultaneously by a single transducer and then separated by filtering. For the present servo system to be effective in connection with a dual magnetic layer disk, the servo signals and the data signals must be individually recognizable and one must exist independently of the other. The first requirement can be met by recording the data signals in the upper layer at a high frequency, at least three or four times the frequency of the servo signals recorded in the lower layer. The second requirement can be met by providing the lower layer of the disk with a considerably higher coercivity than that of the upper layer. This will allow the servo signals to remain undisturbed by subsequent writing and re-writing of the data signals in the upper layer. The signals from both layers can be read simultaneously by a transducer having a single read gap as shown in FIGS. *5a* and *5b*. FIG. *5a* shows a side cross section of the transducer having the erase head on the left, and the read-write head on the right. FIG. *5b* is a bottom view particularly pointing out the single gap in both the erase head and the read-write head. The single gap in the read-write head is significant for purposes of having perfect alignment while simultaneously reading the control signals and the data signals.

The amplitude subtraction involved in the present system is accomplished in the circuitry of FIG. 1. A wide band read amplifier 14 amplifies all signals received from a single read gap in a read transducer 15. A high frequency filter amplifier 16 is connected to the output of amplifier 14 to filter out the data signals. A pair of filter amplifiers 17 and 18 are connected to the output of amplifier 14. Each of these filters is tuned to a particular frequency, 17 being tuned to F1 and 18 being tuned to F2, to detect the signals from the individual servo tracks. The respective servo signals are passed from amplifiers 17 and 18 through a pair of linear gates 19 and 20, through A.C. amplifiers 21 and 22 to peak rectifiers 23 and 24. The signal from amplifier 22 is inverted in peak rectifier 24, so that the two D.C. servo signals will be of opposite polarity. This is accomplished by merely reversing a diode in peak rectifier 24. The peak rectified D.C. servo signals are then applied to opposite sides of a D.C. summing amplifier 25 which adds the two servo signals algebraically to provide a fine position error signal output for the transducer positioning motor or actuator 12. Since the two D.C. servo signals are of opposite polarity, the algebraic sum of the two will have the proper sign to provide the desired direction for the fine position error signal. The linear gates 19 and 20 each consist of a pair of emitter followers which can be gated on and off to pass or block the signal from its associated filter amplifiers 17 and 18, respectively. Each of the filter amplifiers 17 and 18 is connected to both linear gates 19 and 20. Since the position of servo tracks F1, F2 relative to odd numbered data tracks is reversed for even numbered data tracks means is provided for reversing the connections between the filter amplifiers and the linear gates to provide the proper direction sense for the position error signal from the summing amplifier 25. That is, for odd numbered data tracks amplifier 17 is connected to gate 19 and amplifier 18 to linear gate 20, while for even numbered data tracks amplifier 17 is connected to gate 20 and amplifier 18 to gate 19. This reversal is carried out by a signal from the address register 13. Whether a track address is an odd number or an even number is indicated by the presence or absence of a binary "1" in the least significant stage of the address register. A signal indicative of the load condition of this stage of the address register is transmitted to both linear gates to control the emitter followers and gate the servo signals into the proper portion of the circuit.

The use of A.C. servo signals in the present invention permits A.C. amplifiers to be used in the circuitry of FIG. 1, with a consequent high degree of accuracy in positioning the transducer to very close tolerances. With the circuitry of FIG. 1 the noise level becomes the limiting feature. In fact, it is theoretically possible to accurately servo the transducer with this circuitry when the strength of the servo signal is at a one to one ratio with the noise level. With D.C. amplification this would be impossible because of the drift inherent in such components.

While the invention has been particularly shown and described with reference to a preferred embodiment thereof, it will be understood by those skilled in the art that the foregoing and other changes in the form and details may be made therein without departing from the spirit and scope of the invention.

What I claim is:

1. A transducer positioning servo system for use in a random access magnetic disk memory including:

a magnetic recording disk having two magnetic layers of different coercivities superimposed on a non-magnetic substrate, the lower layer having a higher coercivity than the upper layer;

a plurality of closely-spaced, concentric, circular servo tracks permanently recorded on the lower magnetic layer in the form of continuous linearly recorded sine waves, alternate ones of said servo tracks being recorded at separate frequencies which are not harmonics of each other;

a plurality of closely-spaced, concentric, circular data tracks recorded on the upper magnetic layer, said data tracks being superimposed on said servo tracks, the center line of said data tracks being over the mid-point between adjacent servo tracks;

a transducer for providing a continuous fine position signal by simultaneously reading the sine waves of two adjacent servo tracks;

an actuator coupled to the transducer; and circuitry connected to the transducer output for separating and comparing two of the said sine waves on adjacent servo tracks, said circuitry developing a continuous servo position error signal for the actuator to position the transducer accurately onto the data track positions at the mid-point between adjacent servo tracks.

2. A transducer positioning servo system for use in a rotatable magnetic storage comprising:

a magnetic recording disk having a dual magnetic layer coating on a non-magnetic substrate;

a plurality of juxtaposed, concentric, circular servo tracks permanently recorded on a first magnetic layer having a first degree of coercivity, said servo tracks being recorded in the form of low frequency sine waves;

a plurality of closely-spaced, concentric, circular data tracks recorded on a second magnetic layer, said second magnetic layer being superimposed over said first magnetic layer and having a lower coercivity than the coercivity of said first layer, said data tracks being in the form of high frequency signals, said high frequency being at least three times the frequency of the highest frequency servo signal recorded in the lower layer;

a transducer, having a single read-gap, for simultaneously reading the sine waves on two adjacent ones of the said juxtaposed servo tracks on the lower magnetic layer, and the data on one of the said data tracks superimposed on said upper magnetic layer, thereby providing a composite signal containing signals from all three of said tracks;

circuitry connected to the transducer output for separating said composite signal, said circuitry developing a continuous servo position error signal; and an actuator coupled to the transducer and responsive to the polarity of said error signal for accurately positioning the transducer over the null point between two adjacent ones of the said juxtaposed servo tracks, thereby positioning said transducer over the center line of a desired one of the said data tracks.

3. A transducer positioning servo system for use in a random access magnetic disk storage comprising:

a magnetic recording disk having a dual magnetic layer coating on a non-magnetic substrate;

a first magnetic layer having a relatively high coercivity superimposed on said non-magnetic substrate, said high coercivity layer being adapted for having recorded thereon a plurality of low frequency servo tracks;

a second magnetic layer, having a relatively low coercivity on said first magnetic layer, said second magnetic layer being adapted for having recorded thereon a plurality of high frequency data tracks;

a transducer having a single read-gap for simultaneously reading signals from both said first and said second magnetic layers, the signal from the first layer comprising two of the said low frequency servo tracks, the signal from the second layer comprising one of the said high frequency data tracks;

circuitry connected to the transducer output for separating said three signals and comparing the two signals from said first magnetic layer, said circuitry developing a continuous servo position error signal;

an actuator coupled to the transducer and responsive to said error signal for positioning the transducer accurately over a null point between two of the said low frequency servo tracks, thereby maintaining said transducer over the center line of a desired one of the said data tracks.

4. A transducer positioning servo system for a random access magnetic disk storage comprising:

a magnetic recording disk having two magnetic layers of different coercivity superimposed on a non-magnetic substrate;

a plurality of juxtaposed, concentric, circular servo tracks recorded on the lower magnetic layer in the form of continuous linearly recorded sine waves, adjacent ones of said servo tracks being recorded at separate frequencies which are not harmonics of each other;

a plurality of closely-spaced, concentric, circular data tracks recorded on the upper magnetic layer, the center line of said data tracks being over the boundary line between two of the said juxtaposed servo tracks;

a transducer, having a single read-gap, for simultaneously reading the sine waves on two adjacent ones of the said juxtaposed servo tracks on the lower magnetic layer, and the data on one of the said data tracks superimposed on said upper magnetic layer, the transducer providing a composite signal containing signals from all three of said tracks;

circuit means connected to the transducer output for separating and comparing the two sine waves on adjacent servo tracks, and for developing a continuous servo fine position error signal; and an actuator coupled to the transducer and responsive to the polarity of said error signal for accurately positioning the transducer over said boundary line between two adjacent ones of the said juxtaposed servo tracks.

References Cited

UNITED STATES PATENTS

| | | | |
|---|---|---|---|
| 2,643,130 | 6/1953 | Kornei | 179—100.2 |
| 2,647,954 | 8/1953 | Howell | 179—100.2 |
| 2,714,133 | 7/1955 | Barry | 179—100.2 |
| 3,052,567 | 9/1962 | Gabor et al. | 179—100.2 |
| 3,185,775 | 5/1965 | Camras | 179—100.2 |
| 3,263,031 | 7/1966 | Welsh | 340—174.1 |

BERNARD KONICK, *Primary Examiner.*

V. P. CANNEY, *Assistant Examiner.*